(12) United States Patent
Aso et al.

(10) Patent No.: US 7,335,274 B2
(45) Date of Patent: *Feb. 26, 2008

(54) PRODUCTION METHOD OF DECORATIVE FILM

(75) Inventors: Tsutomu Aso, Saitama (JP); Satoshi Tamura, Saitama (JP); Atsushi Taniguchi, Saitama (JP)

(73) Assignee: Shin-Etsu Polumer Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/525,544

(22) Filed: Sep. 22, 2006

(65) Prior Publication Data

US 2007/0051467 A1 Mar. 8, 2007

Related U.S. Application Data

(63) Continuation-in-part of application No. 11/018,562, filed on Dec. 21, 2004, now Pat. No. 7,135,085.

(30) Foreign Application Priority Data

Dec. 22, 2003 (JP) ............................. 2003-425350

(51) Int. Cl.
- *B44C 1/16* (2006.01)
- *B65G 15/30* (2006.01)
- *B65H 23/26* (2006.01)
- *B28B 11/04* (2006.01)
- *B65H 20/36* (2006.01)
- *B41M 3/12* (2006.01)
- *B05D 1/40* (2006.01)

(52) U.S. Cl. ............... 156/237; 156/230; 156/235; 156/240; 156/247; 474/242; 474/254; 427/146; 427/177; 226/170

(58) Field of Classification Search ............... 156/229, 156/230, 235, 237, 240, 247, 249; 474/242, 474/254; 427/146; 226/170
See application file for complete search history.

(56) References Cited

U.S. PATENT DOCUMENTS 3,616,021 A * 10/1971 Valerius ...................... 156/247

(Continued)

FOREIGN PATENT DOCUMENTS

JP  2-33290  7/1990

(Continued)

OTHER PUBLICATIONS

English Translation of Japanese Patent No. 3015173; 3 pages.

(Continued)

*Primary Examiner*—Philip Tucker
*Assistant Examiner*—Sonya Mazumdar
(74) *Attorney, Agent, or Firm*—Osha Liang LLP

(57) ABSTRACT

A production method of a decorative film comprising a step of, in a state in which a transparent resin film is laid on a surface of a laminate sheet in which a pattern layer is placed on one surface of a base film of a thermoplastic resin, inserting the laminate sheet and the transparent resin film into between a pair of endless belts placed opposite each other, thereby obtaining a decorative film, wherein the transparent resin film is preheated by contact with a peripheral surface of a preheat roll urged toward the endless belt, and the transparent resin film is run so as to constantly contact a peripheral surface of at least one guide roll during a period between departure from the peripheral surface of the preheat roll and contact with the laminate sheet.

11 Claims, 9 Drawing Sheets

U.S. PATENT DOCUMENTS

| | | | | |
|---|---|---|---|---|
| 4,287,285 A | * | 9/1981 | Mosehauer | 430/117.4 |
| 4,670,080 A | * | 6/1987 | Schwarz et al. | 156/307.5 |
| 4,794,855 A | * | 1/1989 | Okajima et al. | 100/154 |
| 7,135,085 B2 | * | 11/2006 | Aso et al. | 156/240 |

FOREIGN PATENT DOCUMENTS

| | | |
|---|---|---|
| JP | 3-51205 | 8/1991 |
| JP | 06-339987 | 12/1994 |
| JP | 3015173 | 8/1995 |
| JP | 09-248855 | 9/1997 |
| JP | 09-267346 | 10/1997 |
| JP | 11-091041 | 4/1999 |

OTHER PUBLICATIONS

Patent Abstracts of Japan; Publication No. 11-091041; dated Apr. 6, 1999; 1 page.

Patent Abstracts of Japan; Publication No. 63-039308; dated Feb. 19, 1988; 1 page.

Patent Abstracts of Japan; Publication No. 62-212111; dated Sep. 18, 1987; 1 page.

Patent Abstracts of Japan; Publication No. 06-339987; dated Dec. 13, 1994; 1 page.

Patent Abstracts of Japan; Publication No. 09-248855; dated Sep. 22, 1997; 1 page.

Patent Abstracts of Japan; Publication No. 09-267346; dated Oct. 14, 1997; 1 page.

* cited by examiner

PRODUCTION METHOD OF DECORATIVE FILM

RELATED APPLICATIONS

This is a continuation-in-part application of application Ser. No. 11/018,562 filed on Dec. 21, 2004, now U.S. Pat. No. 7,135,085.

BACKGROUND OF THE INVENTION

1. Field of the Invention

The present invention relates to a production method of a decorative film used for decoration of office automation equipment and home appliances, or molded components such as automotive interior materials, e.g., center panels, console boxes, switch bases, and so on.

2. Related Background of the Invention

Examples of the known methods of producing the molded components such as the automotive interior materials decorated with the decorative film include methods such as hydrographic transcription, in-mold molding, and insertion molding. Among these, the production method by insertion molding is particularly generally employed in recent years.

In this insertion molding, a thermoplastic resin such as vinyl chloride resin, acrylonitrile-butadiene-styrene resin (hereinafter referred to as "ABS resin"), or olefin resin is molded by injection molding on a back surface of a decorative film (a surface on the base film side) formed in a predetermined 3D shape by a method such as vacuum molding, pressure forming, vacuum pressure forming, or press molding, thereby obtaining a molded product integrated with the decorative film.

The mainstream of the conventional production methods of decorative film was a production method including a step of "coating": a pattern layer (design layer) is printed onto a base film of vinyl chloride resin, and a polyurethane resin is applied onto the pattern layer to form a transparent resin layer (clear layer).

Besides the above methods, a special production method of decorative film is a method of performing continuous thermal pressing to laminate a transparent, vinyl chloride resin film or acrylic resin film on a pattern layer provided on one surface of a base film of vinyl chloride resin to form a transparent resin layer (clear layer).

A known decorative film is one having a configuration in which a base film of a resin composition consisting of a mixture of a vinyl chloride resin and an ABS resin of 30 or more % by weight thereof is used as an adhesive layer and in which a pattern layer of a vinyl chloride resin and a transparent resin layer of a thermoplastic resin such as acrylic resin, vinyl chloride resin, polycarbonate resin, or fluorocarbon resin are stacked in this order on one surface of the adhesive layer (Japanese Utility Model No. 3015173).

Incidentally, in order to cope with environmental issues, recycling issues, etc. in recent years, the vinyl chloride resin used heretofore has been and is being replaced by other resins such as the ABS resin, olefin resin, and so on, as the resin for injection molding for forming the molded components to be decorated with the decorative film. For example, where the ABS resin is used instead of the vinyl chloride resin, it is also necessary to use the ABS resin for the base film of the decorative film.

However, many resins including the ABS resin, used as substitutes for the vinyl chloride resin, are inferior in solvent resistance and, therefore, it is very difficult to directly print the pattern layer on the surface of such resins.

Then, for example, a method sometimes employed is to print the pattern layer on the transparent resin layer of acrylic resin, contrary to the case of the vinyl chloride resin, and to laminate the base film of ABS resin thereon (Japanese Patent Application Laid-Open No. 11-91041).

Another method is to prepare a laminate in which one surface of a carrier film with excellent solvent resistance is coated with polyurethane resin or the like to form a transparent resin layer and in which the pattern layer is printed thereafter on the transparent resin layer, and to thermally transfer the pattern layer and the transparent resin layer from the laminate onto a base film of ABS resin.

SUMMARY OF THE INVENTION

However, the printing onto the transparent resin layer is not so easy, either, because the solvent resistance of the transparent resin such as the acrylic resin is not always adequate. In addition, the film of acrylic resin has many defects so called "fish eyes" and has the problem that they tend to induce print defects.

In the method of coating one surface of the carrier film with polyurethane resin or the like to form the transparent resin layer, it was difficult to form a thick transparent resin layer, and this method thus had the problem that glossiness of the surface of the transparent resin layer was not sufficient.

An object of the present invention is therefore to provide a production method of a decorative film capable of readily forming a pattern layer without print defects and obtaining a decorative film with excellent glossiness of its surface as well, even in cases not using the vinyl chloride resin.

A production method of a decorative film according to the present invention comprises a step of, in a state in which a transparent resin film is laid on a surface of a laminate sheet in which a pattern layer is placed on one surface of a base film of a thermoplastic resin, on the pattern layer side, inserting the laminate sheet and the transparent resin film into between a pair of endless belts placed opposite each other, and conveying the laminate sheet and the transparent resin film, thereby obtaining a decorative film in which a transparent resin layer of the transparent resin film is placed on the surface of the laminate sheet on the pattern layer side (this step will sometimes be referred to hereinafter as "second step"). Each of the pair of endless belts is stretched between a first roll for heating the endless belt, and a second roll, and the pair of endless belts are driven by rotation of the first and second rolls so that the endless belts run from the first roll toward the second roll on the side where the endless belts are placed opposite each other. In the above step, the laminate sheet is mounted and conveyed on one of the pair of endless belts running on peripheral surfaces of the first rolls in such an orientation that the base film is in contact with the endless belt, the transparent resin film is laid on the surface of the conveyed laminate sheet on the pattern layer side, and thereafter the laminate sheet and the transparent resin film are inserted into between the pair of endless belts. Furthermore, the transparent resin film is preheated by contact with a peripheral surface of a preheat roll urged toward the endless belt, and the transparent resin film is run so as to constantly contact a peripheral surface of at least one guide roll during a period between departure from the peripheral surface of the preheat roll and contact with the laminate sheet.

In the production method of the decorative film of the present invention, the second step involves laminating the transparent resin film on the pattern layer under heat and pressure through the use of a pair of endless belts placed opposite each other, whereby the decorative film can be obtained with excellent glossiness of the surface on the transparent resin layer side. Further, the transparent resin film is preheated by a preheat roll, whereby the transparent resin film unlikely to wrinkle and makes air hardly trapped between the transparent resin film and the endless belt, so that the resultant decorative film comes to have better glossiness.

The second step preferably comprises preheating the laminate sheet by contact with a peripheral surface of a preheat roll urged toward the endless belt, and running the laminate sheet so as to constantly contact a peripheral surface of at least one guide roll during a period between departure from the peripheral surface of the preheat roll and contact with the endless belt.

The production method may be arranged as follows: a backer film of a thermoplastic resin is mounted and conveyed on one of the pair of endless belts running on the peripheral surfaces of the first rolls, the laminate sheet is laid on the conveyed backer film in such an orientation that the base film is in contact with the backer film, the transparent resin film is laid on the surface on the pattern layer side of the laminate sheet laid on the backer film, and thereafter the backer film, the laminate sheet, and the transparent resin film are inserted into between the pair of endless belts. In this case, the backer film is preheated by contact with a peripheral surface of a preheat roll urged toward the endless belt, and the backer film is run so as to constantly contact a peripheral surface of at least one guide roll during a period between departure from the peripheral surface of the preheat roll and contact with the endless belt.

The production method according to the present invention may further comprise a step of laying the base film of the thermoplastic resin on a pattern layer of a transfer sheet in which the pattern layer is placed on one surface of a carrier film, thermally transferring the pattern layer onto the base film, and thereafter stripping off the carrier film, thereby obtaining the laminate sheet in which the pattern layer is placed on one surface of the base film (this step will sometimes be referred to as "first step").

The first step involves forming the pattern layer on the base film by thermal transfer from the carrier film, whereby the pattern layer can be readily formed without print defects, even on the surface of the base film made of the resin not necessarily having sufficient solvent resistance, e.g. the ABS resin.

For laminating the transparent resin film under heat and pressure through the use of the endless belts as in the second step, it is necessary to prepare the laminate sheet in which the pattern layer is placed on the base film. It was conventionally difficult to obtain such a laminate sheet itself, where the base film was made of the thermoplastic resin (ABS resin or the like) inferior in solvent resistance to the vinyl chloride resin. In contrast to it, the present invention adopts the first step of forming the pattern layer by thermal transfer from the carrier film to obtain the laminate sheet with high quality, as a step prior to the second step, whereby it becomes first feasible to efficiently and economically perform the second step as described above.

In the first step, it is preferable to cool the laminate sheet by contact with a peripheral surface of a cooling roll at 30 to 100° C., immediately after stripping off the carrier film. During the process the laminate sheet is kept under tension. Therefore, if the tension is applied to the laminate sheet at high temperature, the laminate sheet tends to be drawn out with a constricted part. The drawing of the laminate sheet will cause the problem of deformation of the pattern layer or the like. As the laminate sheet is cooled by contact with the cooling roll set at the predetermined temperature, the laminate sheet becomes unlikely to be drawn out during the process.

The transparent resin film is preferably a film of an acrylic resin, a polycarbonate resin, a fluorocarbon resin, a polyethylene terephthalate glycol resin, or a polyurethane resin in terms of their excellent transparency and weatherability and others.

The base film is preferably a film of an acrylonitrile-butadiene-styrene resin or an olefin resin.

DESCRIPTION OF THE PREFERRED EMBODIMENTS

Figure 1:
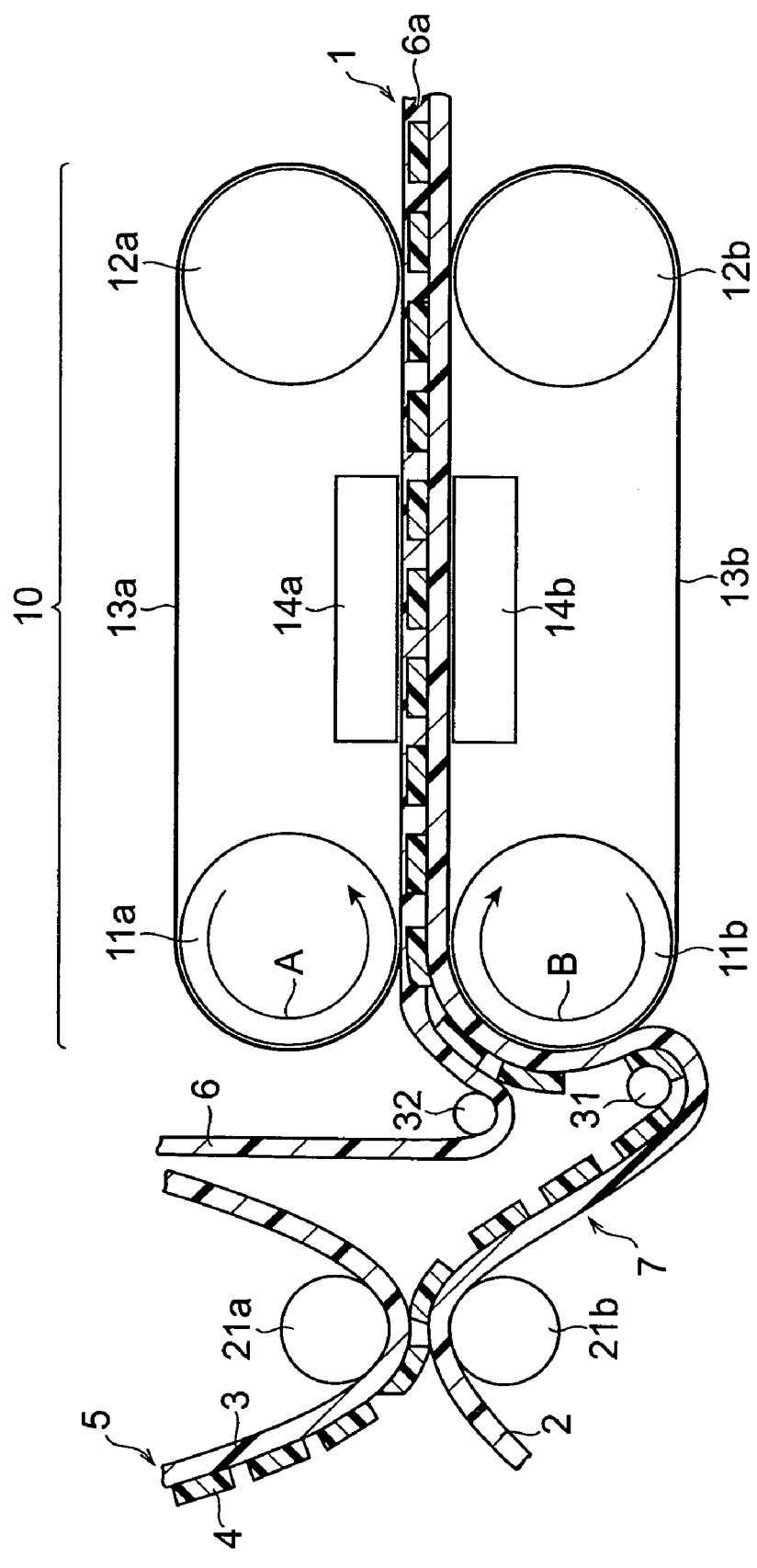
FIG. 1 is a process drawing showing a first embodiment of the production method of the decorative film.

The preferred embodiments of the present invention will be described below in detail with reference to the drawings according to circumstances. It is, however, noted that the present invention is by no means intended to be limited to the embodiments below. The same elements will be denoted by the same reference symbols in the drawings, without redundant description.

FIG. 1 is a process drawing showing the first embodiment of the production method of the decorative film. In the embodiment shown in FIG. 1, the following process is continuously carried out: a base film 2 of a thermoplastic resin, and a transfer sheet 5, which has a carrier film 3 and a pattern layer 4 provided so as to form a predetermined pattern on one surface of the carrier film 3, are continuously supplied from the left in the drawing; finally discharged through the first and second steps is a decorative film 1 comprised of a laminate sheet 7 having the base film 2 and the pattern layer 4 on one surface of the base film 2, and a transparent resin layer 6a provided so as to cover the surface of this laminate sheet 7 on the pattern layer 4 side.

In the production method of the decorative film shown in FIG. 1, first, the first step is carried out to continuously supply the transfer sheet 5 and the base film 2, to let the supplied transfer sheet 5 and base film 2 laid on the surface of the transfer sheet 5 on the pattern layer 4 side, pass between a pair of heating rolls 21a, 21b to keep them under heat and pressure, and thereafter to strip off the carrier film 3 so as to leave the pattern layer 4 on the base film 2, at a downstream position with respect to the pair of heating rolls 21a, 21b, thereby obtaining the laminate sheet 7.

The base film 2 is one made of a thermoplastic resin. This thermoplastic resin is preferably one with good adhesiveness to a resin forming a molded component to be decorated with the resultant decorative film.

The base film 2 is preferably one having the elongation of not less than 100% and the tensile strength of not less than 0.05 N/mm$^2$ in a tensile test measured at 160° C. When the elongation of the base film 2 is less than 100%, the decorative film 2 tends to develop the difficulty of forming into a 3D shape by vacuum molding. On the other hand, when the tensile strength of the base film 2 is less than 0.05 N/mm$^2$, moldability tends to degrade; e.g., a drawdown occurs when the decorative film 2 is heated for molding.

The foregoing elongation is more preferably 100 to 300% and still more preferably 150 to 250%. The foregoing tensile strength is more preferably 0.05 to 0.5 N/mm$^2$ and still more preferably 0.10 to 0.25 N/mm$^2$.

Here the above tensile test is carried out as follows: a test piece processed into a 10 mm-wide rectangle shape is maintained in a 160° C. atmosphere for three minutes and thereafter is drawn under the condition of the test speed of 50 mm/min.

Specifically, a resin component forming the thermoplastic resin of the base film 2 is preferably an ABS resin or an olefin resin and particularly preferably an ABS resin.

The ABS resin is a resin of a polymer containing acrylonitrile, butadiene, and styrene as principal monomer units, and is preferably one containing the monomer units in a weight ratio in the range of acrylonitrile:butadiene:styrene=10-30:5-40:45-70. The average molecular weights of the ABS resin measured by Gel permeation chromatography (GPC) (calibrated with polystyrene standard) are preferably the number-average molecular weight (Mn) in the range of $4.0 \times 10^4$ to $9.0 \times 10^4$ and the weight-average molecular weight in the range of $9.0 \times 10^4$ to $3.0 \times 10^5$. Furthermore, a molecular weight distribution (Mw/Mn) of the ABS resin calculated from the above average molecular weights is preferably 1.7 to 5.0.

The olefin resin is a resin of a polymer containing an olefin monomer such as ethylene or propylene as a principal monomer unit. Specific examples of the olefin resin include polyethylene, polypropylene, ethylene-vinyl acetate copolymers, polyethylene-polypropylene copolymers, and mixtures thereof.

The thermoplastic resin forming the base film 2 may further contain another component such as carbon black as described later, if necessary, in addition to the resin component as described above.

The base film 2 may be transparent and colorless, or may be colored. When the base film 2 is a colored one, it is preferably colored in black or another color by adding carbon black or any other pigment than carbon black into the resin component. Carbon black is particularly preferred, because it is relatively inexpensive and a uniform color tone can be achieved by a small amount within the range where the properties of the resin component such as the ABS resin are not substantially affected. The amount of carbon black added is preferably 0.5 to 1.5 parts by mass relative to 100 parts by mass of the resin component.

The base film 2 can be obtained by one of ordinary methods such as T-die extrusion and calendering, using the thermoplastic resin as described above. The thickness of the base film 2 is preferably 0.05 to 1.0 mm and more preferably 0.08 to 0.5 mm. If the thickness of the base film 2 is less than 0.05 mm, it tends to wrinkle easily upon transfer of the pattern layer or the like. If the thickness exceeds 1.0 mm, it tends to cause a rise of production cost. In addition, the base film 2 may be a film of one layer, or may be one in which a film (backer film) of one or two or more layers is further laminated as a backer layer on the opposite side to the pattern layer 4.

The carrier film 3 in the transfer sheet 5 can be one with strippability enough to transfer the pattern layer 4 onto the base film 2. Namely, the film to be used is one having the peel strength from the pattern layer 4 smaller than the peel strength of the base film 2 from the pattern layer 4. Specifically, a material forming the carrier film 3 is preferably selected from biaxially oriented polyester (biaxially oriented polyethylene terephthalate), biaxially oriented polypropylene, polyethylene naphthalate, polyimide, polyether ketone, polysulfone, and so on in terms of their excellent dimensional stability. Among these, biaxially oriented polypropylene or biaxially oriented polyester is particularly preferred in terms of their moderate price.

The thickness of the carrier film 3 is preferably 10 to 200 μm and more preferably 15 to 50 μm. When the thickness of the carrier film 3 is less than 10 μm, it tends to easily cut during printing of the pattern layer 4. When the thickness exceeds 200 μm, it tends to increase the production cost.

In order to improve the strippability of the pattern layer 4, the carrier film 3 may be one with a release layer provided so as to cover the surface of the film of the thermoplastic resin. This release layer is formed, for example, by coating the film with a release agent such as a melamine resin based release agent, a silicone resin based release agent, a fluorocarbon resin based release agent, a cellulose derivative based release agent, a urea resin based release agent, a polyolefin resin based release agent, a paraffin based release agent, or a composite release agent consisting of two or more of these release agents. A coating method of the release agent can be selected from gravure coating, roll coating, comma coating, and so on.

Furthermore, a stripping layer may be provided between the carrier film 3 and the pattern layer 4. This stripping layer can be provided so as to cover part or all of one surface of the carrier film 3. This stripping layer is stripped off together with the pattern layer 4 from the carrier film 3 on the occasion of stripping off the carrier film 3 to obtain the laminate sheet 7.

A material forming the stripping layer can be selected from acrylic resin, polyester resin, poly(vinyl chloride) resin, cellulose resin, rubber type resin, polyurethane resin, poly(vinyl acetate) resin, vinyl chloride-vinyl acetate copolymer resin, ethylene-vinyl acetate copolymer resin, and so on. A method of forming the stripping layer can be selected from coating methods such as gravure coating, roll coating, and comma coating and from printing methods such as gravure printing and screen printing.

The pattern layer 4 is a layer made of color ink in which a pigment or dye for imparting a desired color to the pattern layer is dissolved or dispersed as a colorant in a thermoplastic resin as a binder, and is formed in a predetermined pattern on one surface of the carrier film 3. The thermoplastic resin used as a binder can be selected from vinyl chloride-vinyl acetate copolymer resin, polyvinyl resin, polyamide resin, polyester resin, acrylic resin (polyacrylic resin), polyurethane resin, polyvinyl acetal resin, polyester polyurethane resin, cellulose ester resin, alkyd resin, and so on.

The pattern layer 4 can be formed, for example, by one of the ordinary printing methods such as offset printing, gravure printing, and screen printing. Particularly, the offset printing or the gravure printing is preferred for multicolor printing or tone expression. In the transfer sheet 5 the pattern layer 4 is formed in the predetermined pattern on one surface of the carrier film 3, but the pattern layer 4 may be formed so as to cover the whole of one surface of the carrier film 3.

An adhesive layer for enhancing adhesive strength to the base film 2 may be provided according to need on the surface of the pattern layer 4 opposite to the carrier film 3. This adhesive layer can be formed, for example, by coating the pattern layer with acrylic resin (polyacrylic resin), polystyrene resin, or polyamide resin by means of a gravure coater, a roll coater, a comma coater, or the like.

The base film 2 and the transfer sheet 5 are placed between heating rolls 21a, 21b to be kept under heat and pressure, while running to the downstream (to the right in the drawing). This results in thermally transferring the pattern layer 4 onto the base film 2. At this time, the base film 2 comes into contact with the heating roll 21b, while the transfer sheet 5 comes into contact with the heating roll 21a. The heating roll 21a is a rubber roll and the heating roll 21b a metal roll. The surface temperature of the heating roll 21b being the metal roll is regulated to control the heating temperature. The surface temperature of the heating roll 21b is preferably 140 to 200° C. When the surface temperature of the heating roll 21b is less than 140° C., the transfer of the pattern layer 4 tends to become hard. When the surface temperature exceeds 200° C., the base film 2 tends to be drawn out with a constricted part.

It is also possible to adopt a configuration wherein the base film 2 and the transfer sheet 5 are made to pass between the heating rolls 21a, 21b in such orientation that the base film 2 is located on the heating roll 21a side and the transfer sheet 5 on the heating roll 21b side, contrary to the form shown in FIG. 1. In this case, the surface temperature of the heating roll 21b is preferably 120 to 180° C. If the surface temperature of the heating roll 21b in this case is less than 120° C., the transfer of the pattern layer 4 tends to become hard. If the surface temperature exceeds 180° C., the base film 2 tends to be drawn out with a constricted part.

Subsequently, the second step is carried out to laminate a transparent resin film 6 onto the surface on the pattern layer 4 side of the laminate sheet 7 formed through the first step as described above, by heat and pressure with endless belts 13a, 13b of double belt press 10, thereby forming a transparent resin layer 6a.

The double belt press 10 is comprised principally of a pair of endless belts 13a, 13b placed opposite each other, first rolls 11a, 11b for heating the endless belts 13a, 13b, and second rolls 12a, 12b. The endless belt 13a is stretched between the first roll 11a and the second roll 12a, and the endless belt 13b is stretched between the first roll 11b and the second roll 12b, respectively. The endless belts 13a, 13b are mirror-finished, such as endless belts of steel.

Then the endless belts 13a, 13b are driven by rotation of the first and second rolls so that they run from the side of the first rolls 11a, 11b toward the side of the second rolls 12a, 12b on the opposed surface side. For this reason, the first roll 11 a rotates in a direction indicated by arrow A (counter-clockwise in the drawing) and the second roll 11b in a direction indicated by arrow B (clockwise in the drawing). The second rolls 12a, 12b also rotate in similar fashion.

A pressing part 14a for pressing the laminate sheet 7 and the transparent resin film 6 conveyed between the opposed surfaces is disposed between the first roll 11a and the second roll 12a and at a position near the inner peripheral surface of the endless belt 13a. Furthermore, a pressing part 14b opposed to the pressing part 14a is disposed between the first roll 11b and the second roll 12b and at a position near the inner peripheral surface of the endless belt 13b.

In the second step, first, the laminate sheet 7 is guided via an outer peripheral surface of a guide roll 31 disposed in the vicinity of the first roll 11b, and is forced under pressure by this guide roll 31 to be introduced thereby onto the outer peripheral surface of the endless belt 13b running on the outer peripheral surface of the first roll 11b, in such orientation that the base film 2 is urged onto the endless belt 13b. Then the transparent resin film 6 is guided via an outer peripheral surface of a guide roll 32 disposed in the vicinity of the first roll 11b, and is forced under pressure by the guide roll 32 onto the surface on the pattern layer 4 side of the laminate sheet 7 conveyed toward the opposed surfaces of the pair of endless belts 13a, 13b by rotation of the endless belt 13b, whereby the transparent resin film 6 is supplied so as to be urged onto the laminate sheet 7 on the first roll 11b. The guide rolls 31 and 32 apply the air pressure of 2 to 6 kgf/cm$^2$ to the base film 2 or to the transparent resin film 6.

Subsequently, the laminate sheet 7 and the transparent resin film 6 laid on the surface on the pattern layer 4 side thereof are inserted into between the opposed surfaces of the pair of endless belts 13a, 13b. At this time, the laminate sheet 7 and the transparent resin film 6 are preferably inserted in such a pressed contact state as to prevent air to be trapped between them.

The transparent resin film 6 is a film of a thermoplastic resin with transparency enough to permit visual recognition of the pattern layer 4 in the form of resultant decorative film 1. The thermoplastic resin for forming the transparent resin film 6 can be selected from acrylic resin, polycarbonate resin, fluorocarbon resin, polyethylene terephthalate glycol (PETG) resin, polyurethane resin, polypropylene resin, polyethylene resin, polyester resin, polystyrene resin, ABS resin, polyamide resin, and so on. Among these, the thermoplastic resin is preferably acrylic resin, polycarbonate resin, fluorocarbon resin, polyethylene terephthalate glycol resin, or polyurethane resin. The acrylic resin is a resin of a polymer comprised essentially of an acrylic monomer such as methyl methacrylate. Examples of the fluorocarbon resin include tetrafluoroethylene resin, tetrafluoroethylene-hexafluoropropylene copolymer resin, tetrafluoroethylene-ethylene copolymer resin, tetrafluoroethylene-perfluorovinyl ether copolymer resin, chlorotrifluoroethylene resin, vinylidene fluoride resin, and so on. The transparent resin film 6 may be a single-layer film of one of these resins, or may be a multilayer film consisting of a stack of two or more types of films. The multilayer film is obtained by making a laminate of films by a method such as coextrusion, thermal lamination, or dry lamination. The thermal lamination can be carried out by continuous thermal pressing with a double belt press or the like. The dry lamination can be conducted with an adhesive of a polyester type, polyester-polyurethane type, a polyether-polyurethane type, a polyether-polyisocyanate type, an epoxy type, or the like. This adhesive may contain an additive of a curing agent such as polyisocyanate or polyol according to need.

The thickness of the transparent resin film 6 is preferably 0.02 to 1.00 mm and more preferably 0.05 to 0.50 mm. If this thickness is less than 0.02 mm, the surface tends to become rougher because of influence of the pattern layer 4 after vacuum molding of the decorative film 1, for example. If the thickness exceeds 1.00 mm, cost tends to increase.

As the laminate sheet 7 and the transparent resin film 6 are conveyed in the vicinity of the first rolls 11a, 11b, they are heated by contact with the endless belts 13a, 13b mainly heated by thermal conduction from the first rolls 11a, 11b as heated. The temperature of the first rolls 11a, 11b is set so that the maximum reaching temperature (head temperature)

of the endless belts 13a, 13b becomes 150 to 200° C. and more preferably 160 to 190° C. If this head temperature is less than 150° C., the glossiness of the surface tends to degrade after the vacuum molding or the like of the decorative film 1. When the head temperature exceeds 200° C., the pattern layer 4 tends to flow during the conveyance between the endless belts.

During the conveyance between the endless belts 13a, 13b, the laminate sheet 7 and the transparent resin film 6 are pressed by the endless belts 13a, 13b. The pressure for this pressing operation is obtained by pressing the endless belts 13a, 13b by the pressing parts 14a, 14b. The pressure at this time is within the range of 15 to 40 kgf/cm$^2$. When this pressure is less than 15 kgf/cm$^2$, the glossiness of the transparent resin layer 6a formed tends to degrade. When the pressure exceeds 40 kgf/cm$^2$, this process tends to become industrially disadvantageous. The laminate sheet 7 and the transparent resin film 6 are rapidly cooled during passage between the pressing parts 14a and 14b.

Furthermore, the laminate sheet 7 and the transparent resin film 6 are cooled to 40 to 100° C. as being conveyed via the neighborhood of the pressing parts 14a, 14b and the second rolls 12a, 12b. If this cooling temperature is higher than 100° C., the decorative film 1 discharged from the double belt press 10 tends to become harder to be stripped off from the endless belts 13a, 13b. If the cooling temperature is less than 40° C., this process tends to become industrially disadvantageous.

Figure 2:
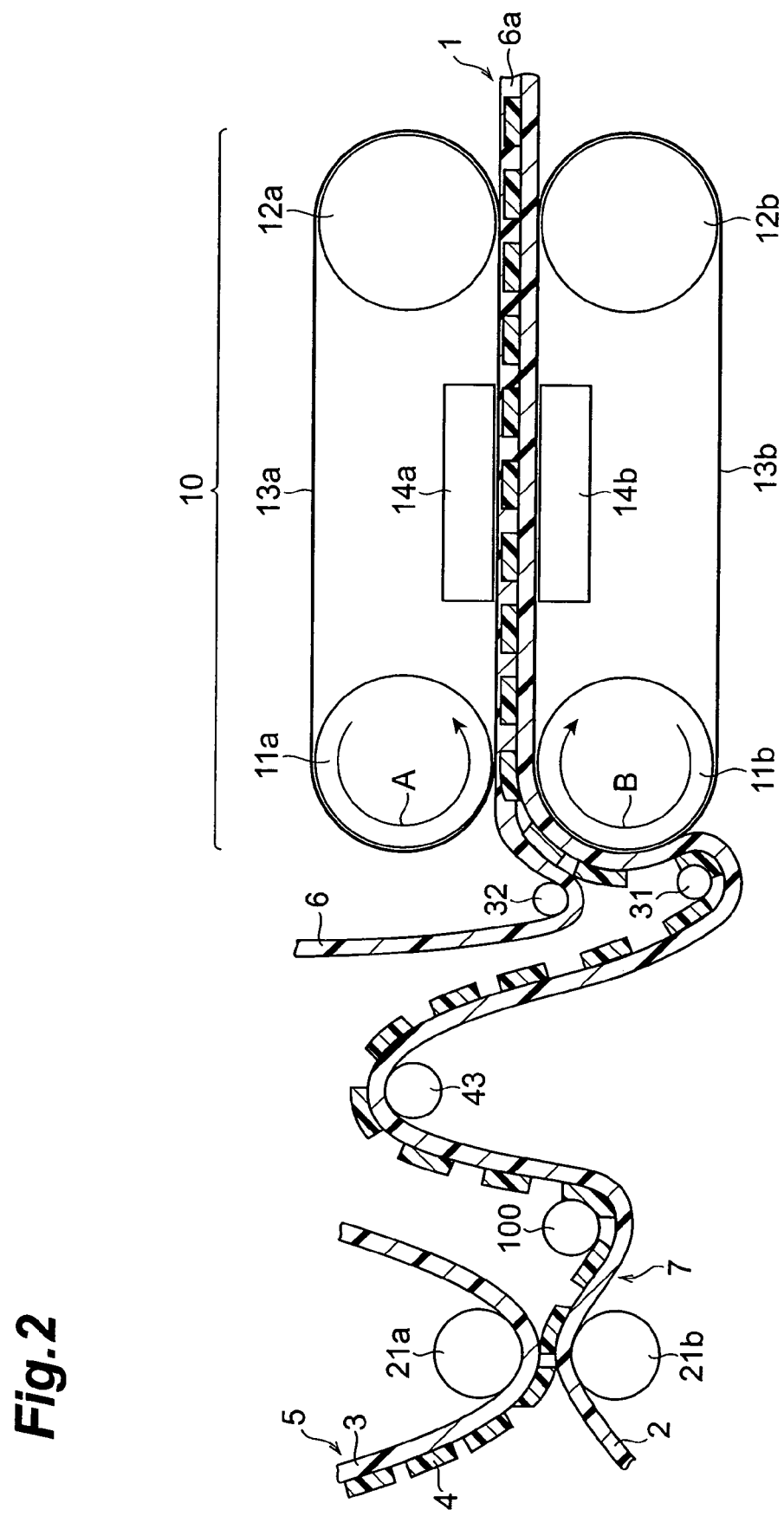
FIG. 2 is a process drawing showing a second embodiment of the production method of the decorative film.

FIG. 2 is a process drawing showing the second embodiment of the production method of the decorative film. In the embodiment shown in FIG. 2, the laminate sheet 7, which is formed by passing between the heating rolls 21a, 21b and thereafter stripping off the carrier film 3, is cooled as running in contact with an outer peripheral surface of a cooling roll 100, immediately after the stripping of the carrier film 3. The cooling roll 100 is disposed in the vicinity of the location where the carrier film 3 is stripped off.

The temperature (surface temperature) of the cooling roll 100 is set to be 30 to 100° C. and more preferably 40 to 80° C. When this temperature exceeds 100° C., the laminate sheet 7 is not cooled well and thus tends to be drawn out with a constricted part, or the pattern layer 4 tends to be adhered in part to the cooling roll 100. If this temperature is less than 30° C. on the other hand, the quick cooling tends to cause roughness in the surface of the laminate sheet 7 because of air trapped between the laminate sheet 7 and the cooling roll 100. The roughness in the surface of the laminate sheet 7 causes air to be readily captured between the laminate sheet 7 and the endless belt 13b, while being kept under heat and pressure by the double belt press 10. This trapping of air can cause projections and depressions in the surface when the decorative film 1 is exposed to high temperature, e.g., 160° C.

After leaving the cooling roll 100, the laminate sheet 7 is conveyed via a guide roll 43 to the double belt press 10. Thereafter, the decorative film 1 is obtained in a manner similar to that in the aforementioned first embodiment.

Figure 3:
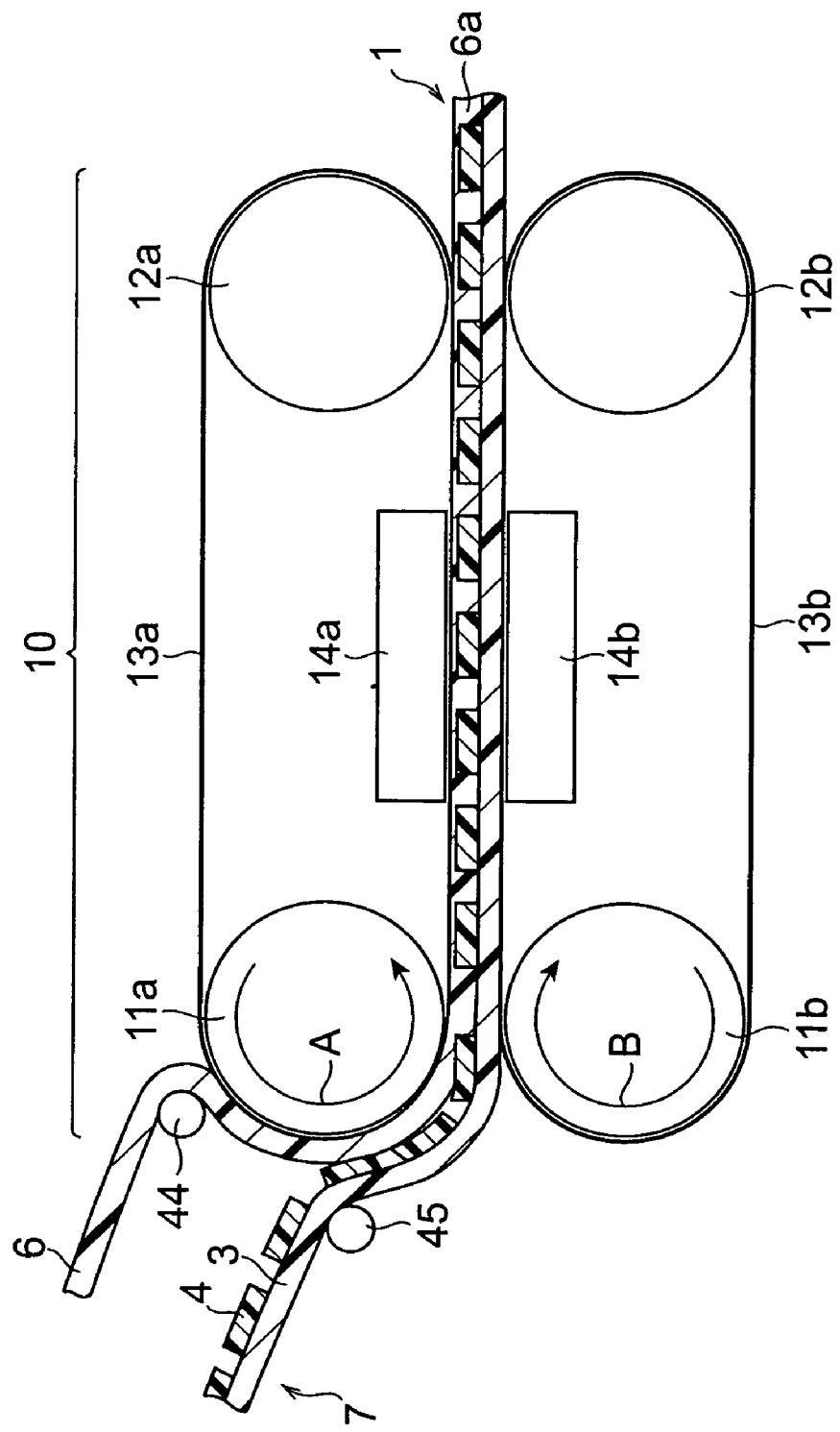
FIG. 3 is a process drawing showing a third embodiment of the production method of the decorative film.

FIG. 3 is a process drawing showing the third embodiment of the production method of the decorative film. In the second step of the embodiment shown in FIG. 3, first, the transparent resin film 6 is guided via an outer peripheral surface of a rubber guide roll 44 disposed in the vicinity of the first roll 11a, and is pressed by this guide roll 44, whereby the transparent resin film 6 is supplied so as to be urged onto the outer peripheral surface of the endless belt 13a running on the outer peripheral surface of the first roll 11a. Then the laminate sheet 7 is placed so as to be urged onto the surface of the transparent resin film 6 on the opposite side to the endless belt 13a while the transparent resin film 6 is conveyed toward the opposed surfaces of the endless belts 13a, 13b. Thereafter, the laminate sheet 7 and the transparent resin film 6 are inserted into between the opposed surfaces of the endless belts 13a, 13b. The laminate sheet 7 is formed in a manner similar to that in the first embodiment or in the second embodiment and thereafter is continuously supplied as guided via a guide roll 45 disposed in the vicinity of the first roll 11a and as urged under pressure by the guide roll 45.

In the second step, when the production method comprising the second step of first conveying the transparent resin film in direct contact with the endless belt, before inserted into between the pair of endless belts, and laying the laminate sheet thereon, as described above, is compared with a case contrary thereto, of first placing the laminate sheet on the endless belt and then laying the transparent resin film thereon without preheating, surface pressure can be efficiently applied for a longer time to the transparent resin film in the laminated state on the laminate sheet during a period in which the transparent resin film runs on the peripheral surface of the endless belt heated by the first roll. This suppresses surface defects so called "Orange peel," degradation of transparency of the transparent resin layer due to whitening, etc. when the resultant decorative film is exposed to high temperature.

Figure 4:
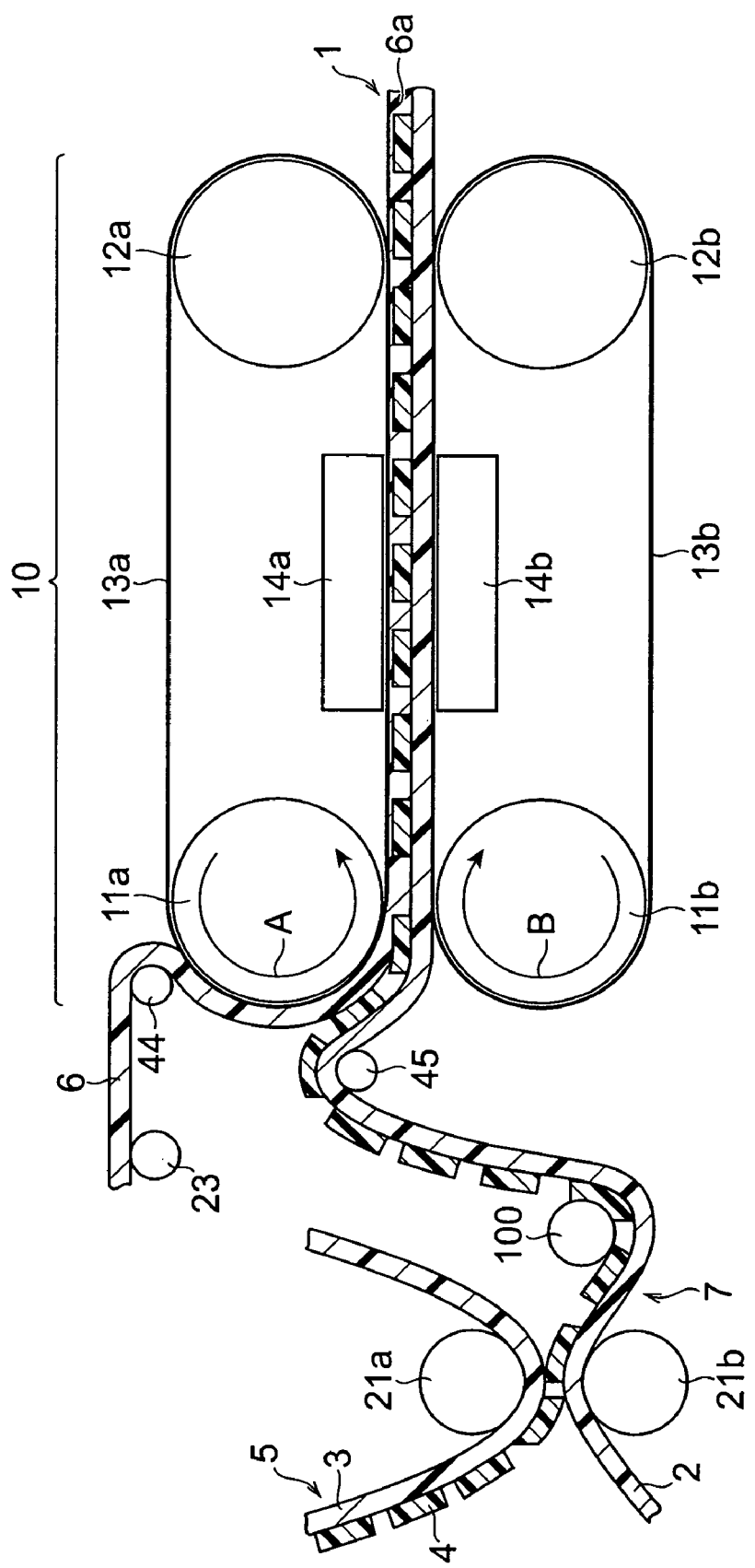
FIG. 4 is a process drawing showing a fourth embodiment of the production method of the decorative film.

FIG. 4 is a process drawing showing the fourth embodiment of the production method of the decorative film. In the embodiment shown in FIG. 4, the transparent resin film 6 is preheated by contact with an outer peripheral surface of a preheat roll 23 before urged against the outer peripheral surface of the endless belt 13a. The preheat roll 23 is set so that the surface temperature thereof becomes 80 to 130° C. If this temperature is less than 80° C., the transparent resin film 6 tends to wrinkle and trap air between the transparent resin film 6 and the endless belt 13a. If the temperature exceeds 130° C., wrinkles tend to be made because of the too high temperature of the transparent resin film 6, and the transparent resin film 6 tends to be adhered in part to the surface of the preheat roll 23.

Figure 5:
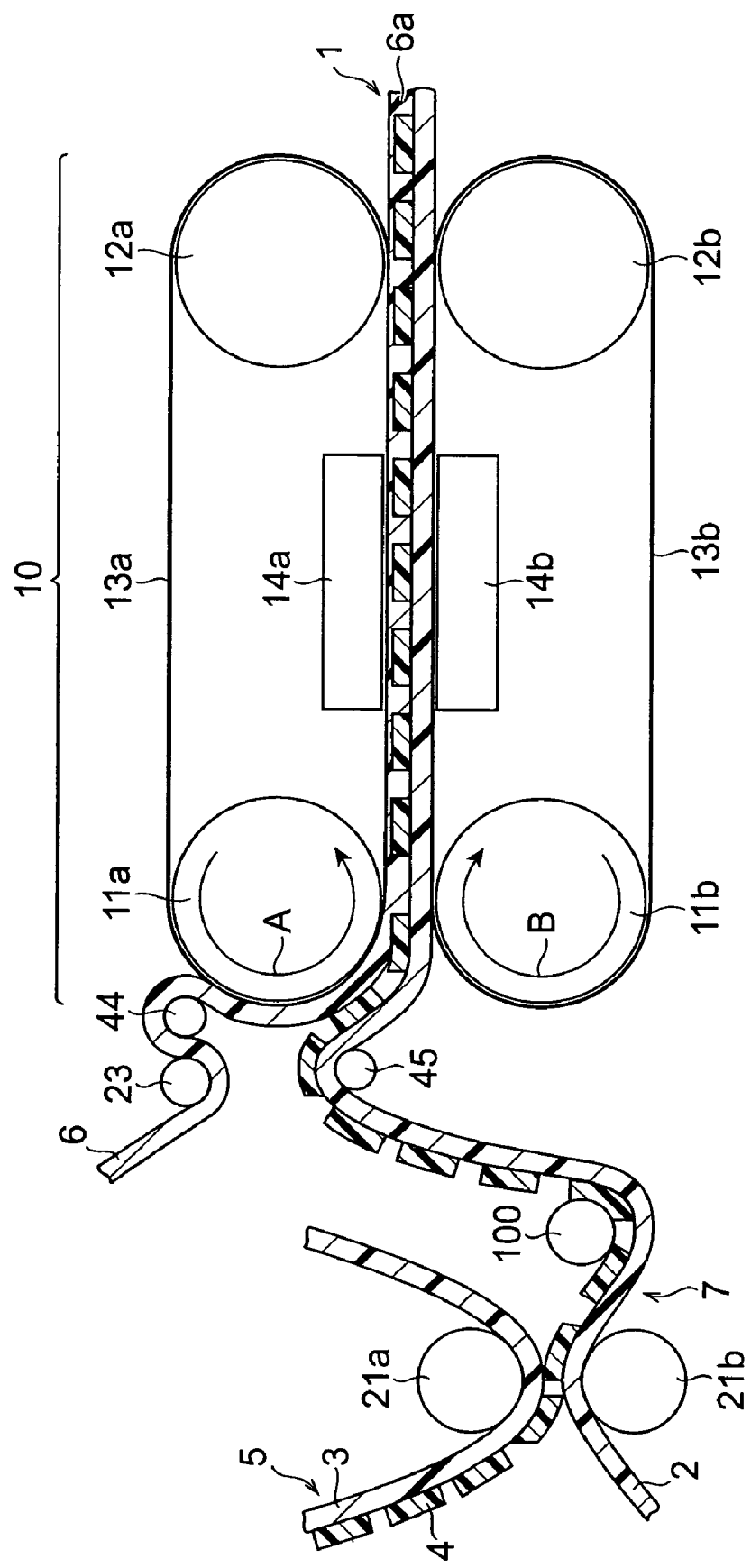
FIG. 5 is a process drawing showing a fifth embodiment of the production method of the decorative film.

In the case where the transparent resin film 6 is preheated as in the fourth embodiment, the transparent resin film 6 preheated by contact with the outer peripheral surface of the preheat roll 23 is preferably made to run so as to contact the outer peripheral surface of guide roll 44 disposed in the vicinity of each of the first roll 11a and the preheat roll 23, during the period between departure from the outer peripheral surface of the preheat roll 23 and contact with the endless belt 13a, as in the fifth embodiment shown in FIG. 5. Furthermore, the preheat roll 23, guide roll 44, and endless belt 13a are more preferably arranged to press the transparent resin film 6 passing between them. In the case of the fourth embodiment, the transparent resin film 6 tends to shake during running between the preheat roll 23 and the guide roll 44 to readily cause trapping of air, whereas in the case of the fifth embodiment the pressure is always applied to the transparent resin film 6 by the contact with the guide roll 44 during the period between departure from the preheat roll 23 and contact with the endless belt 13a, so as to prevent the trapping of air, thereby achieving better glossiness of the decorative film 1.

In the first to fifth embodiments as described above, the first step to the second step are continuously carried out as in-line steps, but, instead thereof, the first step and the second step can also be individually carried out as off-line steps.

Figure 6:
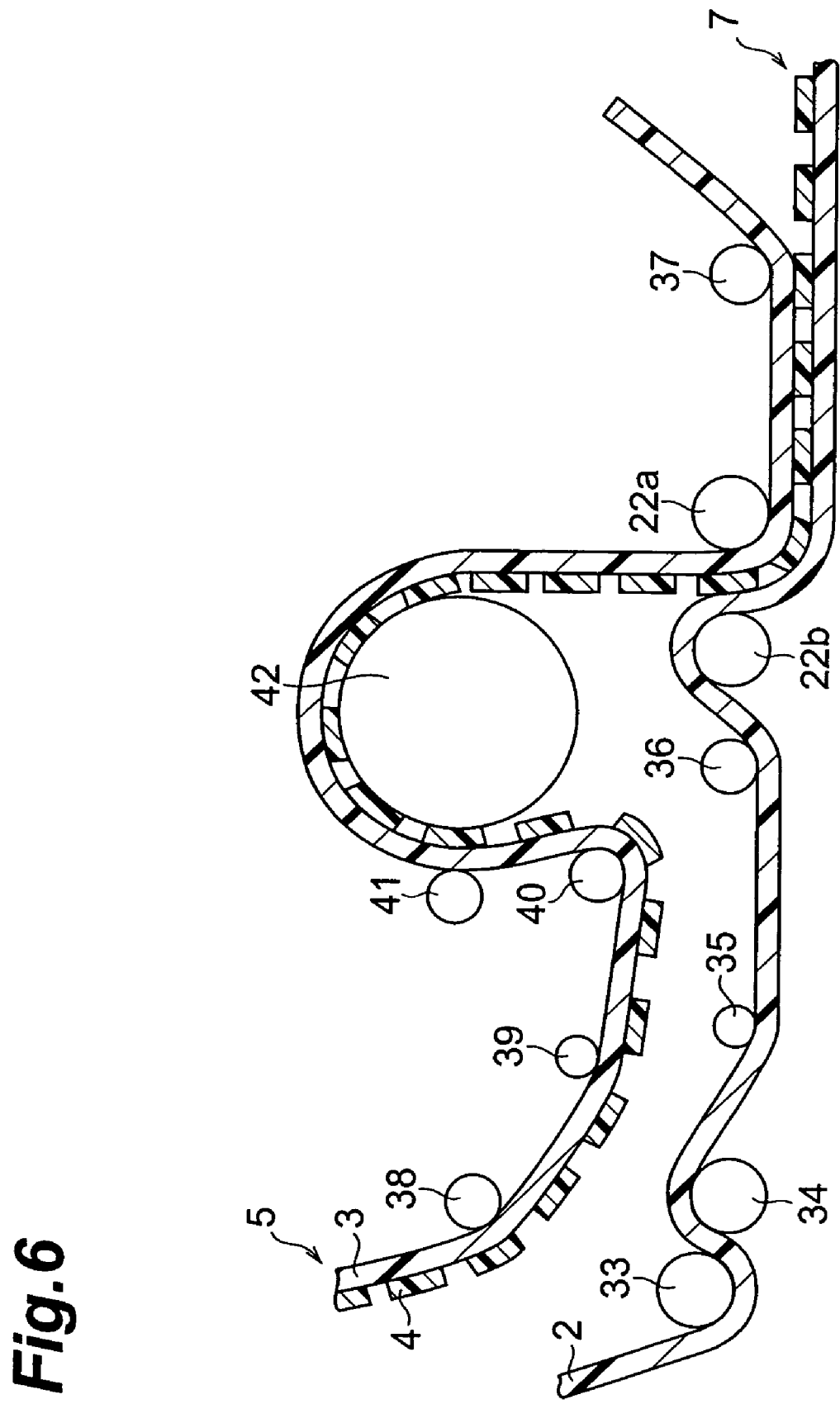
FIG. 6 is a process drawing showing an embodiment of the first step.

FIG. 6 is a process drawing showing an embodiment where the first step to obtain the laminate sheet 7 is carried out as an off-line step. In the embodiment shown in FIG. 6, the base film 2 continuously supplied via guide rolls 33, 34, 35, and 36 is placed on the surface on the pattern layer 4 side of the transfer sheet 5 continuously supplied via guide rolls 38, 39, 40, 41, and 42, and the whole is sandwiched between a pair of heating rolls 22*a*, 22*b* to be kept under heat and pressure. After passing the heating rolls 22*a*, 22*b*, the carrier film 3 is stripped off at the position of guide roll 37 to obtain the laminate sheet 7. The laminate sheet 7 is once rolled up and then fed to the second step using the double belt press 10.

Figure 7:
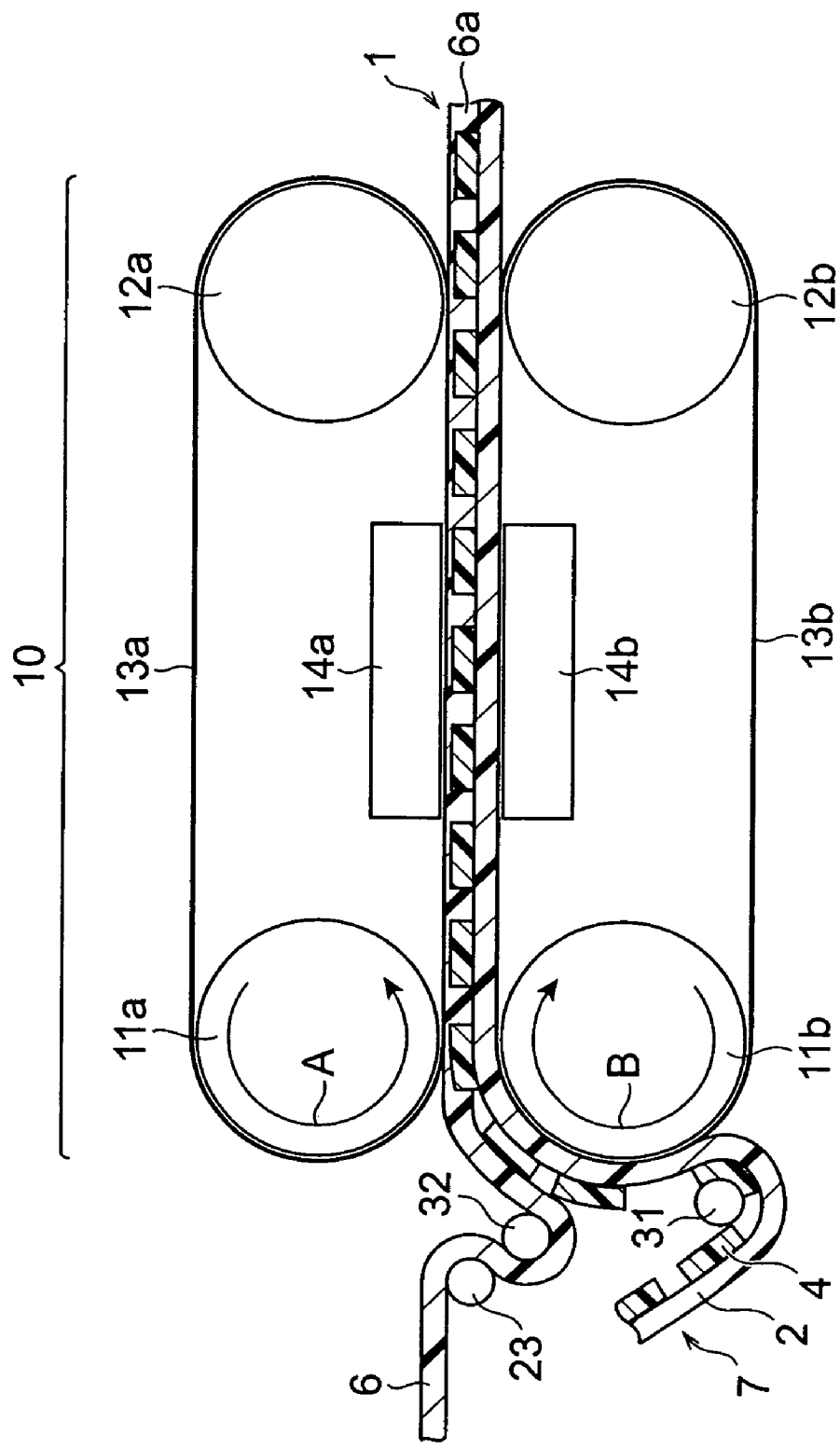
FIG. 7 is a process drawing showing a sixth embodiment of the production method of the decorative film.

FIG. 7 is a process drawing showing the sixth embodiment of the production method of the decorative film. In the embodiment shown in FIG. 7, the transparent resin film 6 is guided via peripheral surfaces of a preheat roll 23 and a guide roll 32 to be supplied onto the surface on the pattern layer 4 side of the laminate sheet 7 conveyed on the endless belt 13*b*. The transparent resin film 6 preheated by contact with the peripheral surface of the preheat roll 23 is run so as to contact the peripheral surface of the guide roll 32 disposed in the vicinity of each of the first roll 11*b* and the preheat roll 23, during a period between departure from the peripheral surface of the preheat roll 23 and contact with the laminate sheet 7. The preheat roll 23 is urged toward the endless belt 13*b*, whereby the transparent resin film 6 is pressed against the laminate sheet 7.

The preheat roll 23 is a metal roll heated so that the surface temperature thereof becomes 80 to 150° C. (preferably, 80 to 130° C.). If this temperature is less than 80° C., the transparent resin film 6 tends to wrinkle and the transparent resin film 6 tends to fail to be adequately stuck to the preheat roll 23 because of insufficient heating, so as to cause trapping of air between the transparent resin film 6 and the laminate sheet 7. If this temperature exceeds 150° C., the transparent resin film 6 becomes so hot as to make wrinkles, and the transparent resin film 6 tends to be adhered in part to the surface of the preheat roll 23.

Figure 8:
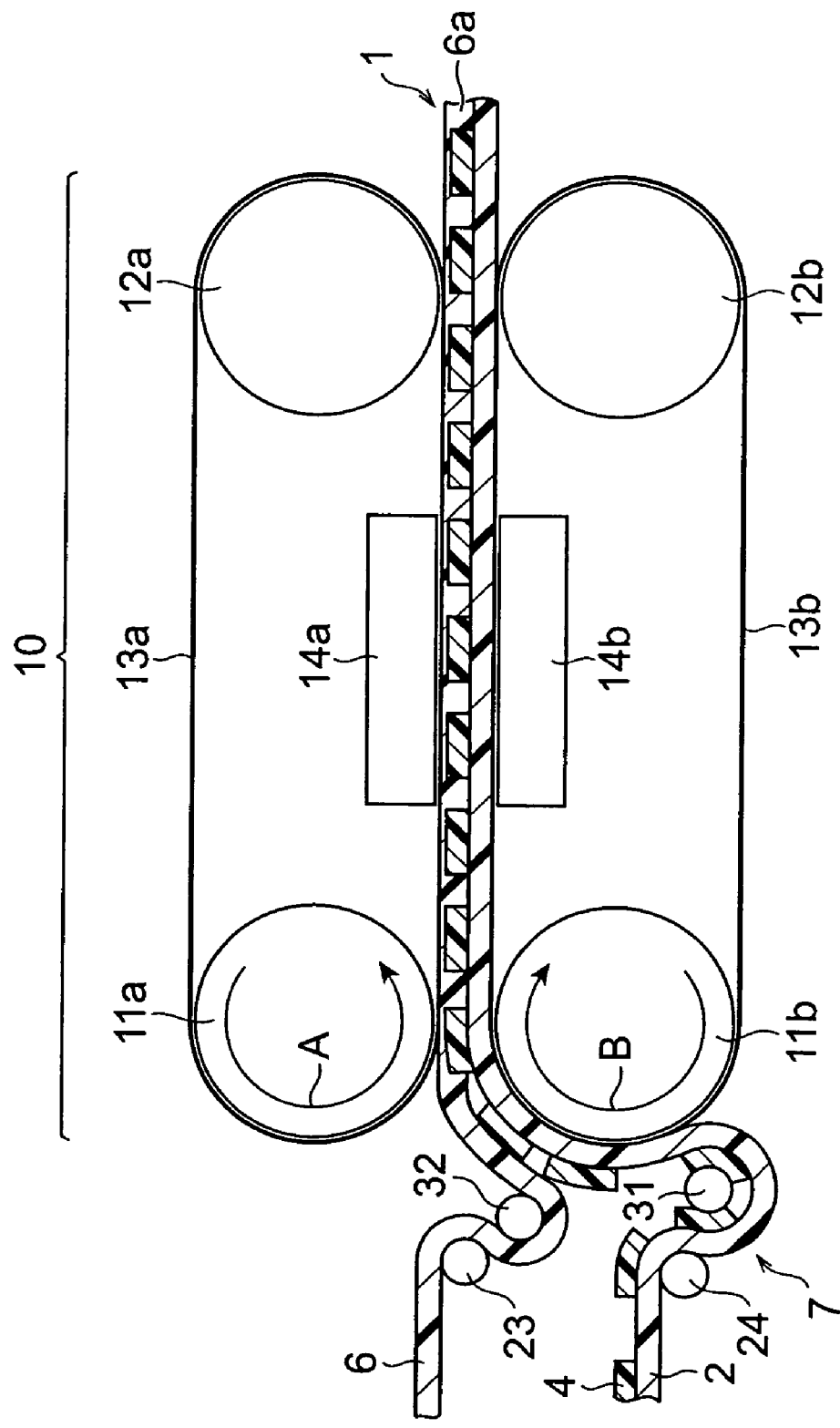
FIG. 8 is a process drawing showing a seventh embodiment of the production method of the decorative film.

FIG. 8 is a process drawing showing the seventh embodiment of the production method of the decorative film. In the embodiment shown in FIG. 8, the transparent resin film 6 is preheated in the same manner as in the embodiment of FIG. 7, and the laminate sheet 7 is also preheated by contact with a peripheral surface of a preheat roll 24. The laminate sheet 7 preheated by contact with the peripheral surface of the preheat roll 24 is run so as to contact a peripheral surface of a guide roll 31 disposed in the vicinity of each of the first roll 11*b* and the preheat roll 24, during a period between departure from the peripheral surface of the preheat roll 24 and contact with the endless belt 13*b*. The preheat roll 24 is urged toward the endless belt 13*b*, whereby the laminate sheet 7 is pressed against the endless belt 13*b*. The preheat roll 24 for preheating the laminate sheet 7 is a metal roll, and is heated at a temperature equal to or higher than the temperature of the preheat roll 23 for heating the transparent resin film 6.

Figure 9:
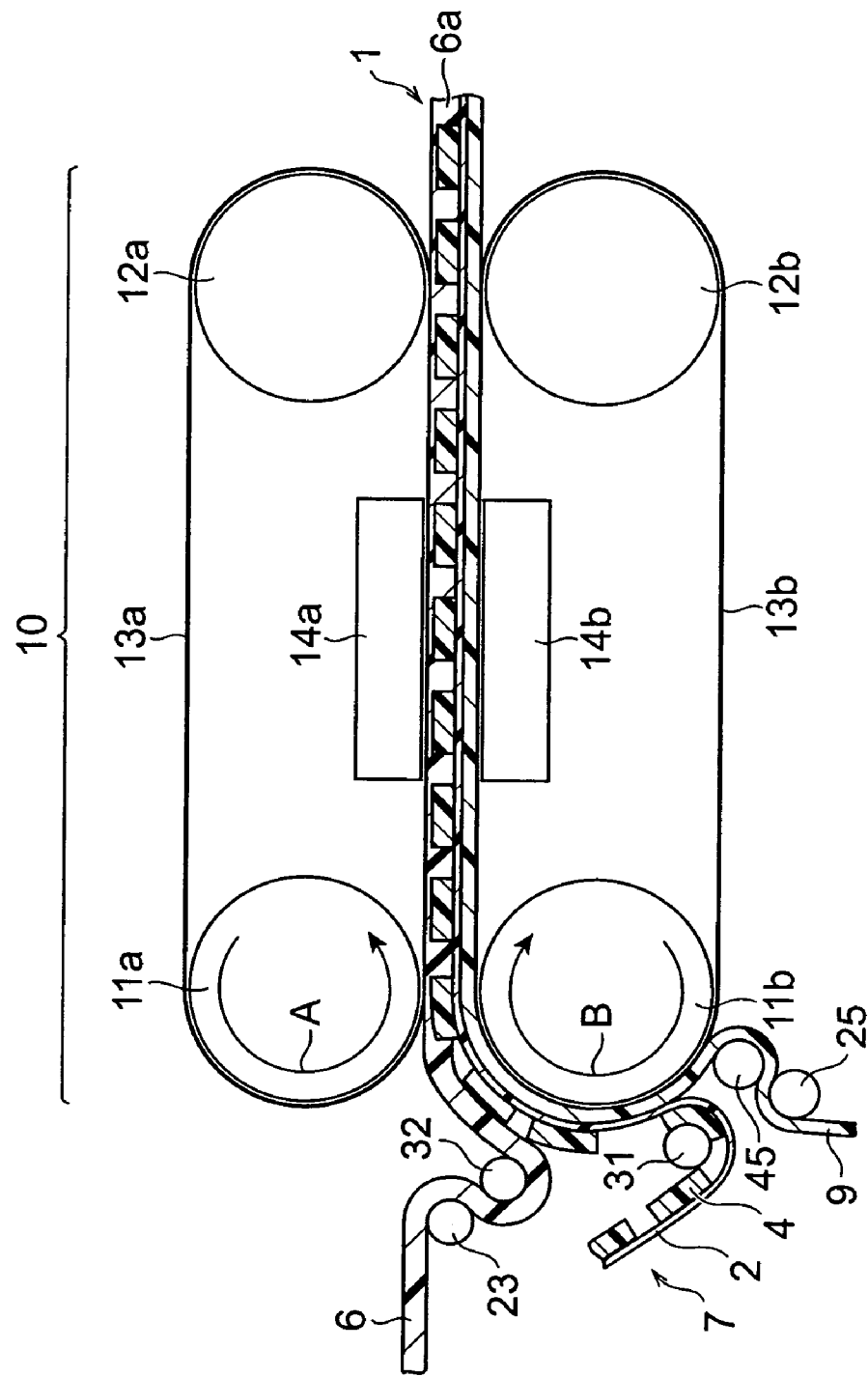
FIG. 9 is a process drawing showing a eighth embodiment of the production method of the decorative film.

FIG. 9 is a process drawing showing the eighth embodiment of the production method of the decorative film. In the embodiment shown in FIG. 9, the decorative film 1 to be produced is one in which a backer film 9 is placed on the surface of the laminate sheet 7 on the base film 2 side. The backer film 9 preheated by contact with a peripheral surface of a preheat roll 25 is run so as to contact a peripheral surface of a guide roll 45 disposed in the vicinity of each of the first roll 11*b* and the preheat roll 25, during a period between departure from the peripheral surface of the preheat roll 25 and contact with the endless belt 13*b*. The preheat roll 25 is urged toward the endless belt 13*b*, whereby the backer film 9 is pressed against the endless belt 13*b*. The preheat roll 25 is a metal roll and is heated at a temperature nearly equal to that of the preheat roll 24 used in the seventh embodiment.

The laminate sheet 7 is laid on the backer film 9 conveyed on the endless belt 13*b*, in such an orientation that the base film 2 of the laminate sheet 7 is brought into contact with the backer film 9. The laminate sheet 7 is guided via the peripheral surface of the guide roll 31 disposed in the vicinity of the endless belt 11*b*, to be supplied onto the backer film 9. The transparent resin film 6 is preheated by contact with the peripheral surface of the preheat roll 23 in the same manner as in the embodiment shown in FIG. 7, and then is pressed against the laminate sheet 7.

The backer film 9 is a film comprised essentially of a thermoplastic resin (preferably, ABS resin) similar to the base film 2. Particularly, the backer film 9 is preferably one colored in black by adding carbon black or a pigment except for carbon black into a resin component. The total thickness of the base film 2 and the backer film 9 is preferably 0.20 to 1.0 mm.

When the pattern layer 4 consists of a metallic ink containing a thermoplastic resin as a binder and a metallic pigment dispersed in the thermoplastic resin, adhesiveness thereof tends to be relatively low to the transparent resin film. For this reason, it is particularly useful to adopt the method of preheating the transparent resin film by the preheat roll before pressing it, as in the sixth to eighth embodiments.

The sixth to eighth embodiments as described above can use the laminate sheet 7 obtained through the first step similar to one of the aforementioned embodiments. The process from the first step to the second step may be continuously carried out as in-line steps, or the process from the first step to the second step may be individually carried out as off-line steps. Particularly, in the case of the eighth embodiment using the backer film, it is preferable to individually carry out the first step and the second step as off-line steps.

EXAMPLES

The embodiments of the present invention will be more specifically described below with Examples and Comparative Example. It is, however, noted that the present invention is by no means intended to be limited to the examples below.

Example 1

A transfer sheet with a pattern layer on one surface of a biaxially oriented polyethylene terephthalate film as a carrier film (available from Toppan Printing Co., Ltd.) and an ABS resin film as a base film (available from Shin-Etsu Polymer Co., Ltd., having the longitudinal elongation of 228%, the longitudinal tensile strength of 0.19 N/mm$^2$, the transverse elongation of 294%, the transverse tensile strength of 0.15 N/mm$^2$, and the thickness of 100 μm) were put between a pair of heating rolls one of which was a metal roll (at the surface temperature of 160° C.) to be stuck to each other under heat. The biaxially oriented polyethylene terephthalate film was stripped off immediately after stuck, thereby to obtain a laminate sheet with the pattern layer on one surface of the ABS resin film. This laminate sheet was rolled up.

Then, using a continuous pressing machine "LCS-D" having much the same configuration as the double belt press 10 shown in FIG. 1 and others, a transparent resin layer was formed so as to cover the surface on the pattern layer side of the laminate sheet obtained above, by a method similar to the part of the second step in the aforementioned first embodiment, to obtain a decorative film. At this time, the transparent resin layer was formed by lamination of a transparent resin film on the laminate sheet under the conditions of the head temperature (maximum reaching temperature of the endless belts) of 180° C., the pressure of 30 kgf/cm$^2$, and the cooling temperature of 60° C. The transparent resin film used herein for formation of the transparent resin layer was a film of an acrylic resin ("009NCT" (trade name) available from Kanegafuchi Chemical Co., Ltd., having the thickness of 125 μm). At the same time as the lamination of the transparent resin film, an ABS resin film (available from Shin-Etsu Polymer Co., Ltd., having the longitudinal elongation of 228%, the longitudinal tensile strength of 0.19 N/mm$^2$, the transverse elongation of 294%, the transverse tensile strength of 0.15 N/mm$^2$, and the thickness of 175 μm) was also laminated as a backer layer on the back surface of the laminate sheet (the surface opposite to the pattern layer).

The decorative film discharged from the continuous pressing machine was covered by a masking film on the transparent resin layer side, slit in part at both ends, and rolled up. The resultant decorative film was heated to 160° C. as an assumed temperature in vacuum molding, and a change in the state of the surface thereof was visually observed. It was confirmed from the observation that the decorative film maintained its good glossiness almost similar to that before heated, on the surface on the transparent resin layer side.

The values of the elongations and tensile strengths of the ABS resin film used for preparation of the decorative film were obtained by conducting the tensile test with a test piece processed in a rectangular shape having the width of 10 mm, in a manner to keep the test piece in the 160° C. atmosphere for three minutes and to draw the test piece in the condition of the test speed of 50 mm/min. The same also applies to the other examples and comparative example.

Example 2

A decorative film was prepared in the same manner as in Example 1, except that an ABS resin film (available from Shin-Etsu Polymer Co., Ltd., having the longitudinal elongation of 219%, the longitudinal tensile strength of 0.12 N/mm$^2$, the transverse elongation of 314%, the transverse tensile strength of 0.09 N/mm$^2$, and the thickness of 360 μm) was used as the base film, a film of an acrylic resin ("S001" (trade name) available from Sumitomo Chemical Co., Ltd.) was used as the transparent resin film, and the first step and the second step were continuously carried out without once rolling up the laminate sheet.

The decorative film discharged from the continuous pressing machine was covered by a masking film on the transparent resin layer side, slit in part at both ends, and thereafter cut into a predetermined length in a crosscut manner. The resultant decorative film was heated at 160° C. being an assumed temperature in vacuum molding and a change in the state of the surface thereof was visually observed. It was confirmed from the observation that the decorative film maintained its good glossiness almost similar to that before heated, on the surface on the transparent resin layer side.

Example 3

A decorative film was prepared in the same manner as in Example 2, except that the process in the configuration similar to that in the aforementioned fourth embodiment was adopted to cool the laminate sheet by the cooling roll at 80° C. and to preheat the transparent resin film by the preheat roll at 120° C.

The resultant decorative film was heated at 160° C. being an assumed temperature in vacuum molding and a change in the state of the surface thereof was visually observed. It was confirmed from the observation that the decorative film maintained its good glossiness similar to that before heated, on the surface on the transparent resin layer side. In addition, the glossiness after the heating was relatively superior to that of the decorative film in Example 2 in that there occurred less fine roughness and orange peel.

Example 4

A decorative film was prepared in the same manner as in Example 3, except that the method similar to that in the aforementioned fifth embodiment was used to run the transparent resin film so as to constantly contact the rubber guide roll during movement from the preheat roll to the endless belt.

The resultant decorative film was heated at 160° C. being an assumed temperature in vacuum molding and a change in the state of the surface thereof was visually observed. It was confirmed from the observation that the decorative film maintained its good glossiness similar to that before heated, on the surface on the transparent resin layer side. In addition, the glossiness after the heating was much superior to the decorative film in Example 3 in that there occurred less fine roughness and orange peel.

Example 5

A decorative film was prepared in the same manner as in Example 2, except that an ABS resin film (having the longitudinal elongation of 90%, the longitudinal tensile strength of 0.04 N/mm$^2$, and the thickness of 360 μm) was used as the base film and the head temperature of the continuous pressing machine was 140° C.

The resultant decorative film was heated at 160° C. being an assumed temperature in vacuum molding and a change in the state of the surface thereof was visually observed. It was confirmed from the observation that the decorative film maintained its good glossiness similar to that before heated, on the surface on the transparent resin layer side. However, vacuum molding was conducted as a trial using this decorative film, and there were portions whose state of shaping was not necessarily good.

Example 6

A decorative film was prepared in the same manner as in Example 2, except that an ABS resin film (having the longitudinal elongation of 120%, the longitudinal tensile strength of 0.04 N/mm$^2$, and the thickness of 360 μm) was used as the base film and the head temperature of the continuous pressing machine was 210° C.

The resultant decorative film was heated at 160° C. being an assumed temperature in vacuum molding and a change in the state of the surface thereof was visually observed. It was confirmed from the observation that the decorative film maintained its good glossiness similar to that before heated, on the surface on the transparent resin layer side. However, the decorative film in this example was slightly inferior in terms of design because of flow of the pattern layer.

Comparative Example 1

An attempt was made to directly form the pattern layer on the ABS resin film used as the base film in Example 1, by printing by the gravure printing method, but the attempt resulted in failure in normal printing because of too low solvent resistance of the ABS resin film. The resultant was significantly inferior in terms of design. Therefore, preparation of a decorative film was not conducted.

Example 7

A metallic transfer film as a transfer sheet with a pattern layer on one surface of a biaxially oriented PET film (available from NIPPON DECOR, Inc.), and an ABS resin film as a base film (Shin-Etsu Polymer Co., Ltd.) were put between a pair of heating rolls one of which was a metal roll (at the surface temperature of 160° C.) to be stuck to each other under heat. The biaxially oriented PET film was stripped off immediately after stuck, thereby to obtain a laminate sheet with the pattern layer on one surface of the ABS resin film.

The resultant laminate sheet, without being rolled up, was guided via the peripheral surfaces of the preheat roll and the guide roll as in the aforementioned seventh embodiment (FIG. 8), to be brought onto the endless belt, and a transparent resin film (film of an acrylic resin, "S001" (trade name), 125 μm thick and available from Sumitomo Chemical Co., Ltd.) fed from a feeder was laid on the laminate sheet running on the endless belt. The transparent resin film was also guided via the preheat roll and guide roll as the laminate sheet was, to be laid on the laminate sheet. Each of the preheat rolls was regulated in temperature with a temperature controller using oil as a heat medium. A preset temperature of the temperature controller connected to the preheat roll for preheating the laminate sheet was 120° C. A preset temperature of the temperature controller connected to the preheat roll for preheating the transparent resin film was 100° C.

After that, the laminate sheet and the transparent resin film were inserted into between the endless belts to laminate the transparent resin film, thereby obtaining a decorative film. The conditions for the lamination with the double belt press were the head temperature 180° C., the pressure 30 kgf/cm$^2$, and the cooling temperature 60° C.

Samples in the size of 500 mm×500 mm were cut out from three portions in the width direction of the resultant decorative film. The 400 mm×400 mm area in the central part of each of these samples was heated to 160° C. with an infrared heater of a vacuum forming machine. After naturally cooled, occurrence of fish eyes was checked in the heated areas and fish eyes over the 0.5 mm$^2$ size were observed in the density of 5 eyes/m$^2$. The sizes of fish eyes were determined based on a predetermined impurity measurement diagram.

An operation was continuously carried out under the above conditions and it was confirmed that the production conditions were very stable and that the yield of the decorative film was 99.6%. On the other hand, when the decorative film was produced without the use of the two preheat rolls for preheating the laminate sheet and the transparent resin film, the yield was as low as 52.4% because of defects such as wrinkles of the transparent resin film at a start and trapping of air due to poor adhesion between the transparent resin film and the pattern layer surface. The number of fish eyes in the decorative film obtained in this case was measured in the same manner as above and was found to be 14 eyes/m$^2$.

Example 8

A woodtone transfer film as a transfer sheet with a pattern layer on one surface of a biaxially oriented PET film (available from NIPPON DECOR, Inc.), and an ABS resin film as a base film (Shin-Etsu Polymer Co., Ltd.) were put between a pair of heating rolls one of which was a metal roll (at the surface temperature of 145° C.) to be stuck to each other under heat. The biaxially oriented PET film was stripped off immediately after stuck, thereby to obtain a laminate sheet with the pattern layer on one surface of the ABS resin film. This laminate sheet was rolled up.

Next, the continuous pressing machine "LCS-D" was used to laminate the transparent resin film on the laminate sheet by a method similar to that in the aforementioned eighth embodiment (FIG. 9), thereby obtaining a decorative film. Specifically, a backer film (ABS black backer film available from Shin-Etsu Polymer Co., Ltd.), the laminate sheet, and the transparent resin film were laid in the order named, and thereafter these were inserted into between the endless belts. The backer film was guided via the preheat roll heated with a temperature controller set at 110° C. and via the guide roll to be mounted onto the endless belt. The laminate sheet was guided via the guide roll to be laid as pressed onto the backer film running on the endless belt. Furthermore, the transparent resin film (S001) was guided via the preheat roll heated with a temperature controller set at 100° C. and via the guide roll to be laid as pressed onto the surface of the laminate sheet on the pattern layer side.

After that, the stack of the backer film, the laminate sheet, and the transparent resin film was inserted into between the endless belts to laminate the transparent resin film, thereby obtaining a decorative film. The conditions for the lamination with the double belt press were the head temperature 170° C., the pressure 30 kgf/cm$^2$, and the cooling temperature 55° C.

Occurrence of fish eyes was checked in the resultant decorative film in the same manner as above, and fish eyes over the 0.5 mm$^2$ size were observed in the density of 4 eyes/m$^2$. On the other hand, when the decorative film was produced without the use of the two preheat rolls, the number of fish eyes in the resultant decorative film was 8 eyes/m$^2$.

What is claimed is:

1. A production method of a decorative film comprising a step of, in a state in which a transparent resin film is laid on a surface of a laminate sheet in which a pattern layer is placed on one surface of a base film of a thermoplastic resin, on the pattern layer side, inserting the laminate sheet and the transparent resin film into between a pair of endless belts placed opposite each other, and conveying the laminate sheet and the transparent resin film, thereby obtaining a decorative film in which a transparent resin layer of the transparent resin film is placed on the surface of the laminate sheet on the pattern layer side, wherein each of the pair of endless belts is stretched between a first roll for heating the endless belt, and a second roll, and the pair of endless belts are driven by rotation of the first and second rolls so that the endless belts run from the first roll toward the second roll on the side where the endless belts are placed opposite each other, wherein the laminate sheet is mounted and conveyed on one of the pair of endless belts running on peripheral surfaces of the first rolls in such an orientation that the base film is in contact with said endless belt, the transparent resin film is laid on the surface of the conveyed laminate sheet on the pattern layer side, and thereafter the laminate sheet and the transparent resin film are inserted into between the pair of endless belts, and wherein the transparent resin film is preheated by contact with a peripheral surface of a preheat roll urged toward the endless belt, and the transparent resin film is run so as to constantly contact a peripheral surface of at least one guide roll during a period between departure from the peripheral surface of the preheat roll and contact with the laminate sheet.

2. A production method of a decorative film according to claim 1, comprising preheating the laminate sheet by contact with a peripheral surface of a preheat roll urged toward the endless belt, and running the laminate sheet so as to constantly contact a peripheral surface of at least one guide roll during a period between departure from the peripheral surface of the preheat roll and contact with the endless belt.

3. A production method of a decorative film according to claim 2, wherein the preheat roll for preheating the laminate sheet is heated at 80 to 150° C.

4. A production method of a decorative film according to claim 1, wherein a backer film of a thermoplastic resin is mounted and conveyed on one of the pair of endless belts running on the peripheral surfaces of the first rolls, the laminate sheet is laid on the conveyed backer film in such an orientation that the base film is in contact with the backer film, the transparent resin film is laid on the surface on the pattern layer side of the laminate sheet laid on the backer film, and thereafter the backer film, the laminate sheet, and the transparent resin film are inserted into between the pair of endless belts, and wherein the backer film is preheated by contact with a peripheral surface of a preheat roll urged toward the endless belt, and the backer film is run so as to constantly contact a peripheral surface of at least one guide roll during a period between departure from the peripheral surface of the preheat roll and contact with the endless belt.

5. A production method of a decorative film according to claim 4, wherein the preheat roll for preheating the backer film is heated at 80 to 150° C.

6. A production method of a decorative film according to claim 1, comprising a step of laying the base film of the thermoplastic resin on a pattern layer of a transfer sheet in which the pattern layer is placed on one surface of a carrier film, thermally transferring the pattern layer onto the base film, and thereafter stripping off the carrier film, thereby obtaining the laminate sheet in which the pattern layer is placed on one surface of the base film.

7. A production method of a decorative film according to claim 6, wherein, immediately after stripping off the carrier film, the laminate sheet is brought into contact with a peripheral surface of a cooling roll at 30 to 100° C.

8. A production method of a decorative film according to claim 1, wherein the preheat roll for preheating the transparent resin film is heated at 80 to 150° C.

9. A production method of a decorative film according to claim 1, wherein the pattern layer consists of a metallic ink.

10. A production method of a decorative film according to claim 1, wherein the base film consists of an acrylonitrile-butadiene-styrene resin or an olefin resin.

11. A production method of a decorative film according to claim 1, wherein the transparent resin film consists of an acrylic resin, a polycarbonate resin, a fluorocarbon resin, a polyethylene terephthalate glycol resin, or a polyurethane resin.

* * * * *